US008502870B2

(12) United States Patent
Bentkovski

(10) Patent No.: US 8,502,870 B2
(45) Date of Patent: Aug. 6, 2013

(54) DEVICE, SYSTEM, AND METHOD OF RAPID IMAGE ACQUISITION

(75) Inventor: Yakov Bentkovski, Ness Ziona (IL)

(73) Assignee: Pima Electronic Systems Ltd., Holon (IL)

(*) Notice: Subject to any disclaimer, the term of this patent is extended or adjusted under 35 U.S.C. 154(b) by 1734 days.

(21) Appl. No.: 11/341,437

(22) Filed: Jan. 30, 2006

(65) Prior Publication Data

US 2006/0170787 A1  Aug. 3, 2006

Related U.S. Application Data

(60) Provisional application No. 60/648,698, filed on Feb. 2, 2005.

(51) Int. Cl.
*H04N 7/18* (2006.01)
*H04N 5/222* (2006.01)

(52) U.S. Cl.
USPC .......................................... 348/155; 348/371

(58) Field of Classification Search
USPC ............... 348/149, 148, 143, 159, 161, 169, 348/170, 171, 172, 371, 155; 382/107, 48, 382/103, 104, 105
See application file for complete search history.

(56) References Cited

U.S. PATENT DOCUMENTS

| | | | | |
|---|---|---|---|---|
| 5,155,474 A * | 10/1992 | Park et al. | ................. | 340/691.5 |
| 5,335,041 A * | 8/1994 | Fox | ................. | 396/61 |
| 5,610,580 A * | 3/1997 | Lai | ................. | 340/541 |
| 5,677,536 A * | 10/1997 | Vickers | ................. | 250/363.09 |
| 5,809,161 A * | 9/1998 | Auty et al. | ................. | 382/104 |
| 6,714,665 B1 * | 3/2004 | Hanna et al. | ................. | 382/117 |
| 6,834,162 B1 * | 12/2004 | Schnell | ................. | 396/153 |
| 6,919,567 B2 * | 7/2005 | Iwasawa | ................. | 250/341.1 |
| 6,977,585 B2 * | 12/2005 | Falk et al. | ................. | 340/506 |
| 6,992,585 B2 * | 1/2006 | Saleh et al. | ................. | 340/571 |
| 7,075,567 B2 * | 7/2006 | Hunter et al. | ................. | 348/208.13 |
| 2001/0037509 A1 * | 11/2001 | Kligman | ................. | 725/105 |
| 2002/0149674 A1 * | 10/2002 | Mathews et al. | ................. | 348/144 |
| 2003/0210329 A1 * | 11/2003 | Aagaard et al. | ................. | 348/159 |
| 2004/0212678 A1 * | 10/2004 | Cooper et al. | ................. | 348/155 |

OTHER PUBLICATIONS

International Search Report and Written Opinion of PCT/IL06/00126 filed on Jan. 31, 2006. Date mailed Jan. 8, 2008.
Huo et al., "Robust Automatic White Balance Algorithm Using Gray Color Points in Images," IEEE Transactions on Consumer Electronics, vol. 52, No. 2, May 2006.
Aptina Imaging, Image Processors/SOC http://www.aptina.com/products/image_processors_soc/.
Presentation on "Technology of CMOS Image Sensor" by SiliconFile Technologies Inc.

\* cited by examiner

*Primary Examiner* — Behrooz Senfi
(74) *Attorney, Agent, or Firm* — Occhiuti Rohlicek & Tsao LLP

(57) ABSTRACT

Device, system, and method of rapid image acquisition. For example, a device includes: an imager able to acquire one or more images; a light detector to detect, in response to a triggering event, a light level corresponding to at least a portion of a field-of-view of the imager; a controller to determine based on the detected light level one or more configurational values of the imager, to transfer the determined configurational values to the imager, and to command the imager to rapidly acquire one or more images utilizing the determined configurational values; and a triggering unit to perform an activation process of the apparatus.

33 Claims, 4 Drawing Sheets

DEVICE, SYSTEM, AND METHOD OF RAPID IMAGE ACQUISITION

PRIOR APPLICATION DATA

This application claims priority and benefit from U.S. Provisional Patent Application No. 60/648,698, entitled "Device, System, and Method of Rapid Image Acquisition", filed on Feb. 2, 2005, which is hereby incorporated by reference in its entirety.

FIELD OF THE INVENTION

The present invention relates to the field of imaging and image acquisition.

BACKGROUND OF THE INVENTION

Some cameras and image acquisition devices may include, for example, a Complementary Metal Oxide Semiconductor (CMOS) imager or a Charge Coupled Device (CCD) imager. When the camera is turned-on, the imager or an imager controller may require a substantial period of time (e.g., approximately two or three seconds) for calibration or calibration of control loops, for example, to calculate values of operational parameters used by the imager, e.g., brightness level, contrast level, saturation level, hue level, or the like. This period of time delays the operation of the camera, increases power consumption, and does not allow a rapid acquisition of an image immediately upon turning-on the camera.

SUMMARY OF THE INVENTION

Various embodiments of the invention provide, for example, devices, systems and methods for rapid image acquisition.

Some embodiments include, for example, a camera able to rapidly acquire images and having an imager, a processor, and a light detector.

In some embodiments, the light detector may measure the level of light (e.g., ambient visible light) in the area or room in which the camera is located. The light detector may produce a signal, e.g., a voltage, responsive to or indicating the measured level of light.

In response to the signal, the processor may determine a set of configuration values of operational parameters of the imager or an imager controller, which correspond to the level of light measured by the light detector. This may be performed by the processor, for example, using pre-programmed algorithms or formulae, or by reading a pre-stored and/or pre-calibrated set of configuration values from a lookup table based on the level of light measured by the light detector.

The determined configuration values may be written into the imager, or into a memory unit associated with the imager. The imager may acquire an image using the stored configuration values.

In some embodiments, optionally, the processor may activate an illumination unit, e.g., based on the measured level of ambient light, and substantially simultaneously with the image acquisition.

In some embodiments, optionally, an internal or external triggering unit may initiate the set of operations described above, for example, upon detection of a triggering event, e.g., motion detection, movement detection, fire detection, smoke detection, or temperature sensing.

Some embodiments of the invention include, for example, an alarm/surveillance system incorporating a camera able to rapidly acquire images.

Some embodiments of the invention include, for example, a method for rapid acquisition of images.

Some embodiments of the invention may allow, for example, avoiding or shortening an initialization or calibration process of an imager.

Embodiments of the invention may allow various other benefits, and may be used in conjunction with various other applications.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
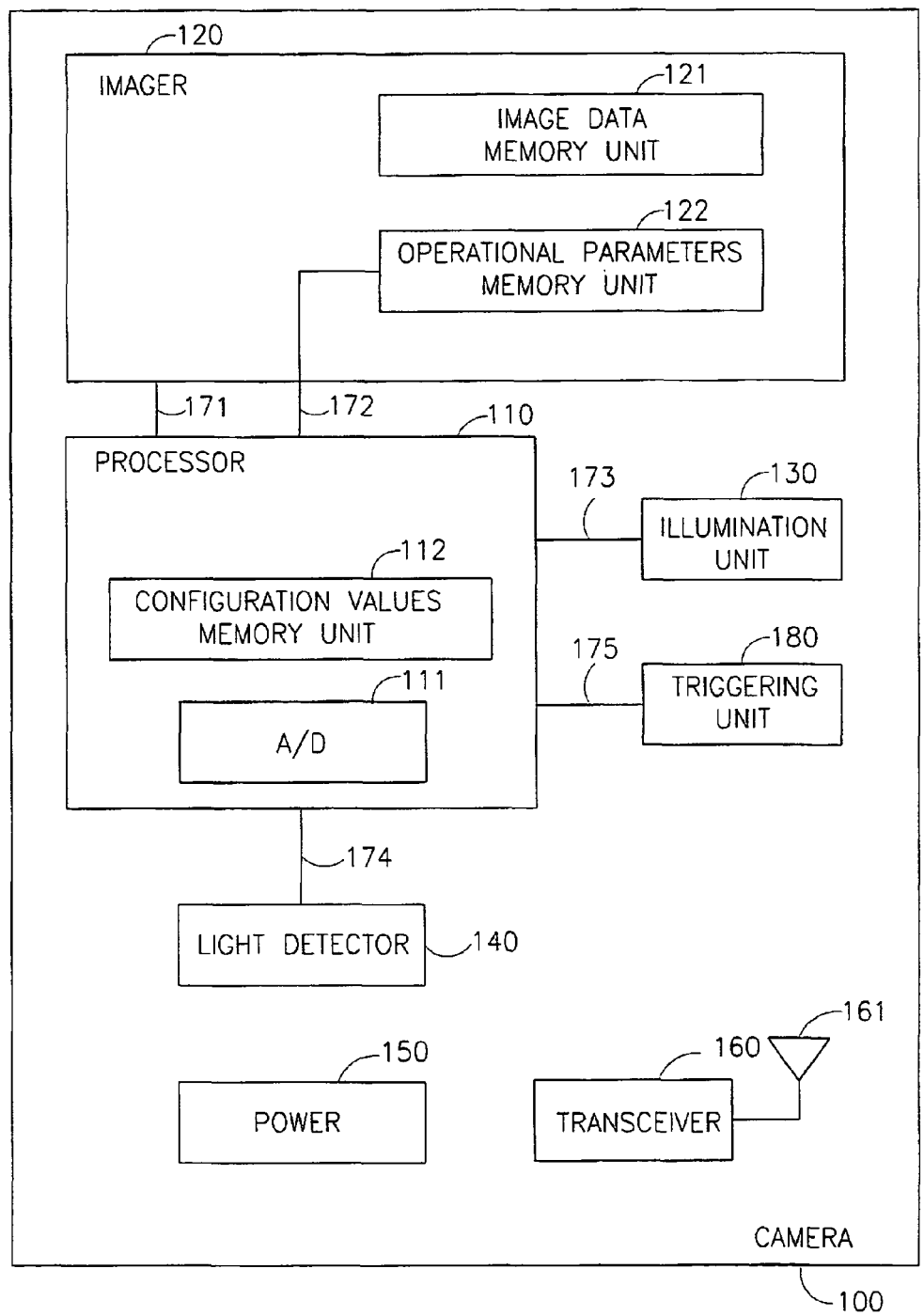
FIG. 1 is a schematic block diagram illustration of a camera able to rapidly acquire images in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the invention will be described. For purposes of explanation, specific configurations and details are set forth in order to provide a thorough understanding of the invention. However, it will also be apparent to one skilled in the art that the invention may be practiced without the specific details presented herein. Furthermore, well-known features may be omitted or simplified in order not to obscure the invention.

Although part of the discussion herein may relate, for exemplary purposes, to configuration and/or calibration of an imager, embodiments of the invention are not limited in this regard, and may further include, for example, configuration and/or calibration of an imager controller or other imaging controller operatively associated with an imager, which may store values of operational parameters of the imagers or which may otherwise command or control the imager.

FIG. 1 schematically illustrates a block diagram of a camera 100 able to rapidly acquire images in accordance with some embodiments of the invention. Camera 100 may be or may include, for example, a mobile or handheld camera, a non-mobile camera, a Pan Tilt Zoom (PTZ) camera, a surveillance camera, a traffic camera, a digital camera, or other suitable image acquisition unit. Camera 100 may be, for example, a stand-alone or independent camera, a member of a network of cameras, a member of an alarm system or surveillance system, or the like.

Camera 100 may include, for example, a processor 110, an imager 120, a light detector 140, and a triggering unit 180. Optionally, camera 100 may further include an illumination unit 130, a power source 150, and a transceiver 160. Camera 100 may include other suitable hardware components and/or software components. In some embodiments, the components of camera 100 may be inter-connected or operatively associated, and may be enclosed in a suitable housing, enclosure, shell or packaging.

Imager 120 may include, for example, a Complementary Metal Oxide Semiconductor (CMOS) imager, a Charge Coupled Device (CCD) imager, or other suitable image sensor or image acquisition unit. In one embodiment, for example, imager 120 may include a single-chip CMOS having an integrated image signal processor and a Joint Photographic Experts Group (JPEG) codec, e.g., imager model CoderCam TC5740 available from TransChip of Ramat Gan, Israel (www.TransChip.com), or other suitable imager.

Imager 120 may be able to acquire images in accordance with one or more standard or non-standard resolutions, for example, Video Graphics Array (VGA) resolution of 640 by 480 pixels, Quarter VGA (QVGA) resolution of 320 by 240 pixels, Sub-QVGA resolution of 160 by 120 pixels, Common Intermediate Format (CIF) resolution of 352 by 288 pixels, or other suitable resolutions. Imager 120 may acquire images in accordance with one or more standard or non-standard color depth, for example, 2 colors (e.g., black and white, or monochrome), 4 colors, 16 colors, 256 colors, 65,536 colors, or the like.

In some embodiments, image 120 may be able to acquire images illuminated by a visible light, e.g., white light or colored light. In alternate embodiments, image 120 may be able to acquire images illuminated by non-visible light invisible light, Infra Red (IR) light, or near-IR light; in such cases, for example, imager 120 may not include an IR coating, e.g., to allow reception and acquisition of IR light, or imager 120 may include or may be an IR-sensitive imager.

Imager 120 may include a memory unit 121 to store data of one or more images acquired by imager 120. The data stored in memory unit 121 may be non-compressed, compressed or encoded, e.g., in accordance with JPEG standard, Motion JPEG (M-JPEG) standard, Moving Picture Experts Group (MPEG) standard, MPEG-2 standard, MPEG-4 standard, or other suitable compression standards or encoding standards.

Imager 120 may optionally include a memory unit 122 to store values of one or more operational parameters of imager 120. The operational parameters may include, for example, exposure period of time (e.g., in milliseconds), frame capture rate (e.g., in frames per second), analog gain, digital gain, brightness level, contrast level, saturation level, hue level, gamma level, or other parameters. In one embodiment, imager 120 may not include a memory unit 122 to store values of operational parameters, and processor 110 may control (e.g., externally to the imager 120) such operational parameters and their corresponding values. In another embodiment, values of operational parameters may optionally be stored in, or set by, an imager controller, which may be integrated with imager 120 or operatively associated with imager 120.

In the exemplary embodiment shown in FIG. 1, memory units 121 and 122 may be implemented as two separate sub-units of imager 120. In other embodiments, memory units 121 and 122 may be implemented as one unit, or as more than two units or sub-units. In some embodiments, memory units 121 and 122 may be external to imager 120, for example, implemented as separate one or more units of camera 100 and operatively associated with imager 120.

Memory units 121 and/or 122 may include, for example, a Random Access Memory (RAM), a Dynamic RAM (DRAM), a Synchronous DRAM (SD-RAM), a Flash memory, a memory card, a memory stick, a volatile memory, a non-volatile memory, a cache memory, a buffer, a memory unit able to store a value or a result in a calculated equation or formula, a short term memory unit, a long term memory unit, a hard disk drive, a floppy disk drive, a Compact Disk (CD) drive, a CD-ROM drive, or other suitable removable or non-removable storage units or memory units.

Illumination unit 130 may include, for example, one or more "flash" illumination units or Light Emitting Diodes (LEDs). In some embodiments, illumination unit 130 may include, for example, a solid-state high-brightness "flash" type LED, a solid-state lamp, or a non-xenon illumination unit. In some embodiments, illumination unit 130 may be able to illuminate, for example, white light, colored light, or other visible light. In alternate embodiments, illumination unit 130 may be able to illuminate, for example, non-visible light, invisible light, IR light, or near-IR light.

Light detector 140 may include, for example, a light sensor, a light meter or a light measurement unit able to sense, detect and/or measure light, e.g., the level of light, visible light or ambient visible light in the area or room in which camera 100 is located. In some embodiments, light detector 140 may include a detector of visible light, or a detector non-sensitive to IR light. In one embodiment, for example, light detector 140 may include a visible light sensor model LX1970 available from Microsemi Integrated Products of California (www.MicroSemi.com), or other suitable light sensors.

Optionally, in some embodiments, light detector 140 may include, or may be positioned in proximity to, a light tunnel or a suitable cone-shaped cavity, which may assist in focusing or trapping light for detection or measurement by light detector 140.

In some embodiments, light detector 140 may produce a signal, for example, a voltage, or a value in a digital format, in relation to the level of light measured by light detector 140. For example, in some embodiments, light detector 140 may produce a voltage in the range of approximately 0 Volts and approximately 2 volts. In one embodiment, for example, the voltage produced may be relatively low (e.g., approximately 0.25 or 0.50 Volts) if the level of light detected by light detector 140 is relatively low, and may be relatively high (e.g., approximately 1.50 or 1.75 Volts) if the level of light detected by light detector 140 is relatively high. In some embodiments, light detector 140 may operate substantially continuously, and may produce and output the voltage substantially continuously. In alternate embodiments, light detector 140 may operate and/or may produce the output non-continuously, periodically, upon request, or on-demand.

In some embodiments, instead of or in addition to producing a voltage, the light detector 140 may produce other type of output signal (e.g., a digital value, a data item or a word in a digital format, or the like) in relation to the level of light measured. In such cases, the light detector 140 may optionally include, for example, an Analog to Digital (A/D) converter which may be used in producing the digital output.

Processor 110 may include, for example, processor, a Central Processing Unit (CPU), a Digital Signal Processor (DSP), a microprocessor, a controller, a low-power processor or controller, a chip, a microchip, an Integrated Circuit (IC), an Application-Specific IC (ASIC), or any other suitable multi-purpose or specific processor or controller. In one embodiment, for example, processor 110 may include a mixed signal microprocessor model MSP430F135, model MSP430x13x, model MSP430x14x, or model MSP430x14x1, available from Texas Instruments of Texas (www.TI.com), or other suitable controller or processor.

Processor 110 may obtain or receive from light detector 140 a signal, e.g., the voltage produced by light detector 140, indicating on the level of light measured by light detector 140. In one embodiment, for example, light detector 140 may provide the voltage to processor 110 through a link 174, e.g., substantially continuously. Optionally, processor 110 may convert the received signal from an analog format to a digital format, using a Analog to Digital (A/D) converter 111 which may be included in processor 110.

In accordance with some embodiments of the invention, processor 110 may produce a set of configuration values of operational parameters which correlate to the voltage or signal received from light detector 140. In some embodiments, for example, processor 110 may calculate and generate configuration values for one or more operational parameters of imager 120, based on the level of light measured by light detector 140, e.g., using one or more codes, programs, algorithms or formulae which may be pre-programmed or pre-stored in processor 110.

In alternate embodiments, processor 110 may include, or may be associated with or have access to, a memory unit 112 able to store one or more configuration values of operational parameters of imager 120. In one embodiment, the configuration values of the operational parameters may be stored in accordance with a pre-defined format (or may be calculated on-the-fly or in real time calculations), for example, as one or more tables, lookup tables, databases, arrays, matrices, lists, files, or the like. Processor 110 may access the configuration values of operational parameters stored in memory unit 112, and may from the memory unit 112 a set of configuration values of operational parameters which correspond to the level of light measured by light detector 140. In one embodiment, the level of light may be used as an index value or a pointer to a set of pre-defined configuration values, e.g., stored as a lookup table in memory unit 112. Memory unit 112 may include, for example, a RAM, a DRAM, a SD-RAM, a Flash memory, a memory card, a memory stick, a volatile memory, a non-volatile memory, a cache memory, a buffer, a short term memory unit, a long term memory unit, a hard disk drive, a floppy disk drive, a Read Only Memory (ROM), or other suitable removable or non-removable storage units or memory units.

For example, in one embodiment, if the level of light measured by light detector 140 is in the range of approximately 64 to 67 Lux, then light detector 140 may produce a voltage in the range of approximately 0.48 to 0.51 Volts, which may be read by processor 110 and converted by A/D converter 111 to a light value in the range of 200 to 209. In the lookup table stored in memory unit 112, the light value in the range of 200 to 209 may correspond to, for example, an exposure period of time of approximately 200 milliseconds, a frame capture rate of approximately 5 frames per second, an analog gain value of approximately 4, and a digital gain value of approximately 37.

In some embodiments, one or more of the configuration values may be pre-programmed into processor 110, or may be pre-calibrated and/or pre-stored in memory unit 112, such that one value of an operational parameter may correspond to multiple values of measured light. For example, in one embodiment, memory unit 112 may include data indicating that for substantially any level of light, a brightness level of approximately −15 may be used, a contrast value of approximately 8 may be used, a saturation value of approximately 20 may be used, a hue value of approximately 7 may be used, a gamma value of approximately 121 may be used, or other pre-determined, constant values may be used.

In some embodiments, the time period in which processor 110 determines the configuration values may be, for example, approximately 10 milliseconds, approximately 15 milliseconds, approximately 25 milliseconds, or other sub-second period of time. In some embodiments, during the time period in which processor 110 determines the configuration values, imager 120 may not operate, may not be activated or operational, may be turned off, may be in stand-by mode, may be in a power-saving mode or "sleep" mode, may not have exposure to an imaged area or room, and/or may not acquire images.

The configuration values, which may be determined by processor 110 using the above-mentioned calculations or by accessing the memory unit 112, may be transferred from processor 110 to imager 120. In one embodiment, processor 110 may transfer the configuration values to imager 120 using a link 171, and imager 120 may write the configuration values into memory unit 122. In another embodiment, processor 110 may directly write the configuration values into memory unit 122 using a link 172.

In some embodiments, optionally, processor 110 may repeat or analyze the reading of the voltage produced by light detector 140. For example, in one embodiment, processor 110 may sample or read the voltage multiple times, e.g., approximately 40 times, with time intervals of approximately 0.25 millisecond between readings. The multiple readings may be analyzed, averaged or optimized, e.g., to produce a more-reliable indication of the level of light measured by light detector 140.

For example, in one embodiment, processor 110 may determine and use an average value of multiple readings of the voltage. In another embodiment, processor 110 may detect the maximum value and the minimum value of multiple readings, and may determine and use the average of the minimum and maximum values. In yet another embodiment, processor 140 may discard one or more readings. Other suitable algorithms, calculations or formulae may be used by processor 110 to analyze multiple readings of voltage produced by light detector 140, e.g., to produce one value of voltage indicative of the light measured by light detector 140. In some embodiments, multiple readings of measured light, and analysis of such multiple readings, may be used, for example, to accurately measure a level of light emitted by a fluorescent light source (e.g., flickering at a frequency of approximately 50 or 60 Hertz).

In some embodiments, processor 110 may determine whether the area or room in which camera 100 is located is illuminated with fluorescent light or neon light. For example, processor 110 may identify a Sinus pattern or a wave pattern in multiple readings of the voltage produced by light detector, and may determine that the area or room in which camera 100 is located is illuminated with fluorescent light or neon light. In such case, processor 110 may use a pre-defined algorithm or formula to analyze or average the multiple readings and to produce a single value indicative of the level of light. In some embodiments, processor 110 may use a first algorithm or set of formulae to process readings from a light determined to be fluorescent light or neon light, and a second, different algorithm or set of formulae to process readings from a light determined to be non-fluorescent light or non-neon light.

In some embodiments, processor 110 may transfer to imager 120 an instruction to acquire an image or a plurality of images ("acquisition instruction"), e.g., through link 171. This may be performed, for example, immediately after writing the configuration values by processor 110 into memory unit 122, or immediately after transferring the configuration values from processor 110 to imager 120. In some embodiments, the acquisition instruction may include, or may be sent after, an instruction to imager 120 to change from a non-active (e.g., a stand-by mode, a power-saving mode, a "sleep" mode, or the like) to an active mode.

In response to the acquisition instruction, imager 120 may acquire one or more images, and may store data of the acquired image or images in memory unit 121. In some embodiments, imager 120 may acquire an image substantially immediately upon receiving the acquisition instruction from processor 110. Imager 120 may, for example, avoid performing a configuration process or initialization process, avoid calculating or determining configuration values for one or more operational parameters of imager 120, and acquire the image using configuration values received from processor 110. In some embodiments (e.g., if imager 120 acquires two or more consecutive images), after acquisition of a first image, imager 120 may perform a configuration process based on the previously-determined operational parameters, thereby allowing decrease of parameter values stabilization process time.

Optionally, imager 120 may compress or encode data of one or more images acquired. In one embodiment, for example, imager 120 may compress image data in accordance with JPEG standard, and may store the compressed image data in memory unit 121.

In some embodiments, optionally, processor 110 may transfer an instruction to illumination unit 130 to operate and illuminate ("illumination instruction"). In one embodiment, the illumination instruction may be transferred from processor 110 directly to illumination unit 130, for example, through a link 173. In another embodiment, the illumination instruction may be transferred from processor 110 indirectly to illumination unit, for example, through the imager 120. In some embodiments, the illumination instruction may be transferred to illumination unit 130 substantially simultaneously when an acquisition instruction is transferred from processor 110 to imager 120. In response to the illumination instruction, illumination unit 130 may illuminate.

In one embodiment, processor 110 may produce and transfer an illumination instruction together with substantially every acquisition instruction, such that substantially every image is acquired by imager 120 while illumination unit 130 illuminates. In another embodiment, processor may produce and transfer an illumination instruction if a one or more pre-defined conditions are met, for example, based on the level of light measured by light detector 140. For example, in one embodiment, processor 110 may produce and transfer an illumination instruction if light detector 140 produces a voltage smaller than 25 percent or the maximum voltage that light detector 140 is able to produce. In another embodiment, processor 110 may produce and transfer an illumination instruction if light detector 140 indicates that the level of light in the area of room in which camera 100 is located is, for example, smaller than 5 Lux, smaller than 3 Lux, or the like.

In one embodiment, the instruction transferred from processor 110 to illumination unit 130 may include an indication of the required period of illumination, and the instruction transferred from processor 110 to imager 120 may include an indication of the required period of exposure. In some embodiments, the required period of illumination may be substantially equal to the required period of exposure, or the required period of illumination and the required period of exposure may overlap. In some embodiments, the required period of illumination and/or the required period of exposure may be included in the above-mentioned configuration values calculated or determined by processor 110.

In some embodiments, camera 100 may optionally include, or may be connected to or associated with, an internal or external triggering unit 180. The triggering unit 180 may include, for example, a triggering source, a motion detector, a movement sensor, a fire detector, a smoke detector, an entry detector, an exit detector, a volume sensor, a temperature sensor, an impact sensor, a touch sensor, an audio-sensor, a sound sensor, or other sensor, monitor or detector able to generate a signal indicating a triggering event. The triggering event may include, for example, a motion or movement in proximity to camera 100 or in the field-of-view of imager 120, an entrance or an exit of a person to an area or a room monitored by camera 100, a change of a property of an area or room monitored by camera 100, or the like.

In some embodiments, upon detection or sensing of a triggering event, the triggering unit 180 may generate a signal ("triggering signal"), which may be transferred, for example, to processor 110 through a link 175. Upon receiving the triggering signal, processor 110 may, for example, access the light detector 140 to obtain a voltage indicating the level of light, determine configuration values (e.g., using calculations or a pre-defined lookup table) for one or more operational parameters of imager 120, transfer the configuration values to imager 120, transfer an acquisition instruction to imager 120, and optionally transfer an illumination instruction to illumination unit 130.

In some embodiments, camera 100 may optionally include, or may be operatively connected to, a power source 150. Power source 150 may provide power to one or more components of camera 100, e.g., processor 110, imager 120, and illumination unit 130. In some embodiments, power source 150 may be internal to camera 100, and may include, for example, one or more rechargeable or non-rechargeable batteries or power-cells, such that camera 100 may be self-powered. For example, in one embodiment, power source 150 may include one or more "AA" batteries, one or more "AAA" batteries, or the like. In other embodiments, power source 150 may include an adaptor or transformer able to provide Alternating Current (AC) or Direct Current (DC).

In some embodiments, camera 100 may optionally include a one-way or two-way transceiver 160. For example, transceiver 160 may transmit image data, acquired by imager 120 and/or stored in memory unit 121, to an external receiver or system. Additionally or alternatively, transceiver 160 may receive data or instructions transmitted to camera 100 from an external transmitter or system, for example, instruction to activate or de-activate camera 100, or a triggering signal generated by an external triggering unit.

Transceiver 160 may include, for example, a transmitter-receiver unit or a transmitter unit and a receiver unit, and may operate in accordance with one or more wireless communication standards or protocol, for example, Bluetooth, ZigBee, 802.11, 802.11a, 802.11b, 802.11g, 802.16, Wi-Fi, Wi-Max, or the like. Transceiver 160 may optionally include, or may be connected to, an internal or external antenna 161 able to transmit and/or receive wireless communication signals.

Although imager 120, light detector 140 and processor 110 are shown as separate components, embodiments of the invention are not limited in this regard, and may include other suitable implementations. In some embodiments, for example, light detector 140 may be integrated within imager 120; additionally or alternatively, processor 110 may be integrated within imager 120, or may be a sub-unit of imager 120. In one embodiment, imager 120 may be used to perform light detection and/or light measurement operations, e.g., instead of light detector 140. In another embodiment, imager 120 may be used to determine and/or set the operational parameters of imager 120 based on the measured level of light, e.g., instead of processor 110. Other suitable implementations may be used in accordance with embodiments of the invention.

Figure 2:
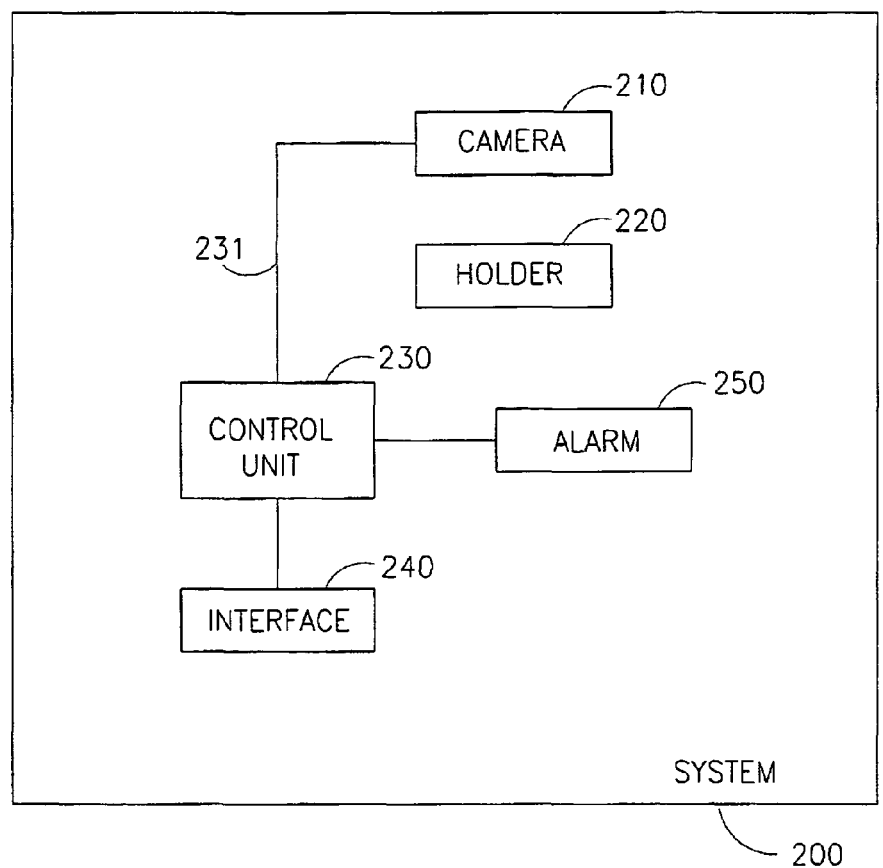
FIG. 2 is a schematic block diagram illustration of a surveillance/alarm system able to utilize rapid image acquisition in accordance with some embodiments of the invention.

FIG. 2 schematically illustrates a block diagram of a surveillance/alarm system 200 able to utilize rapid image acquisition in accordance with some embodiments of the invention. System 200 may include a camera 210, which may be similar or substantially identical to camera 100 of FIG. 1. Optionally, camera 210 may be supported, held or mounted using a suitable holder 220.

System 200 may further include a control unit 230 able to activate, de-activate or otherwise control camera 210 and/or other components of system 200. Control unit 230 may be connected to, or optionally may include, an interface 240, e.g., a keypad, a keyboard, or other input unit. Interface 240 may, for example, allow a user to operate or provide instructions to control unit 230, to enter an activation code or an arming code in order to activate system 200, to enter a de-activation code or a disarming code in order to disarm system 200 or de-activate one or more components of system 200, to enter a code for testing system 200 or its components, or the like.

In some embodiments, upon detection of a triggering event by camera 210, a signal may be transferred from camera 210 to control unit 230 ("alarm signal"), e.g., through a wired or wireless link 231. Upon receiving an alarm signal, control unit 230 may perform one or more pre-defined operations, for example, control unit 230 may transmit a message to a user, control unit 230 may activate an alarm unit 250 which may produce an audible alarm, control unit 230 may lock one or more doors or windows, or the like. In some embodiments, upon detection of a triggering event by camera 210, one or more images may be acquired by camera 210, e.g., using the configuration values as described above.

Figure 3:
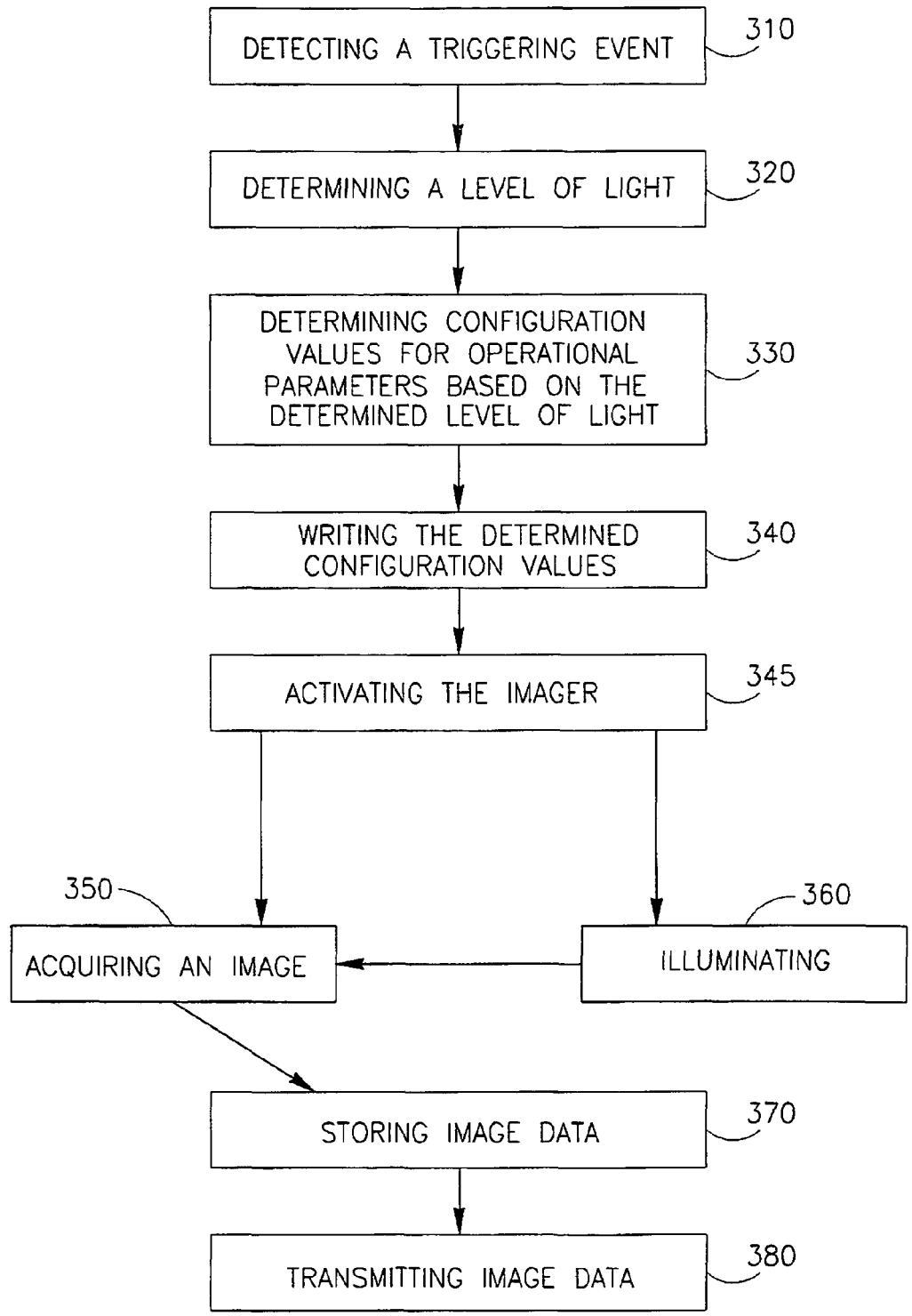
FIG. 3 is a flow-chart diagram of a method of rapid image acquisition in accordance with an embodiment of the invention.

FIG. 3 is a flow-chart diagram of a method of rapid image acquisition in accordance with an embodiment of the invention. The method may be used, for example, by camera 100 of FIG. 1, by camera 210 of FIG. 2, by system 200 of FIG. 2, or by other suitable devices and/or systems.

As indicated at box 310, the method may optionally include, for example, detecting a triggering event. For example, triggering unit 180 of FIG. 1 may detect a movement. This operation may include, for example, sending a triggering signal or other indication of the triggering event, e.g., from triggering unit 180 to processor 110.

As indicated at box 320, the method may include, for example, determining a value indicating the level of light. This operation may include, for example, performing one or more readings of a signal or voltage produced by a light detector, and optionally analyzing, optimizing, or averaging multiple readings to produce one value indicative of the level of light.

As indicated at box 330, the method may include, for example, determining one or more configuration values for one or more operational parameters of an imager, based on the determined level of light. In one embodiment, the determination of configuration values may be performed, for example, using suitable calculations of formulae. In another embodiment, the determination of configuration values may be performed, for example, by reading a set of configuration values (e.g., pre-calibrated and/or pre-stored in a lookup table or database) which corresponds to the determined level of light.

As indicated at box 340, the method may include, for example, writing or otherwise setting the determined configuration values into an imager, or into a memory unit associated with the imager and able to stores values of operational parameters of the imager.

As indicated at box 345, the method may optionally include, for example, turning-on or activating an imager.

As indicated at box 350, the method may include, for example, acquiring one or more images using the determined configuration values of the operational parameters.

As indicated at box 360, optionally, the method may include, for example, illuminating an area to be imaged, e.g., substantially simultaneously with the imaging acquisition operation of box 350. This operation may optionally include, for example, determining whether to illuminate based on the previously determined level of light.

As indicated at box 370, the method may include, for example, storing image data or compressed image data. This may optionally include, for example, compressing or encoding the image data, e.g., using a pre-defined compression or encoding algorithm or standard.

As indicated at box 380, the method may optionally include, for example, transmitting image data, e.g., to an external receiver.

Other suitable operations or sets of operations may be used in accordance with embodiments of the invention.

Figure 4:
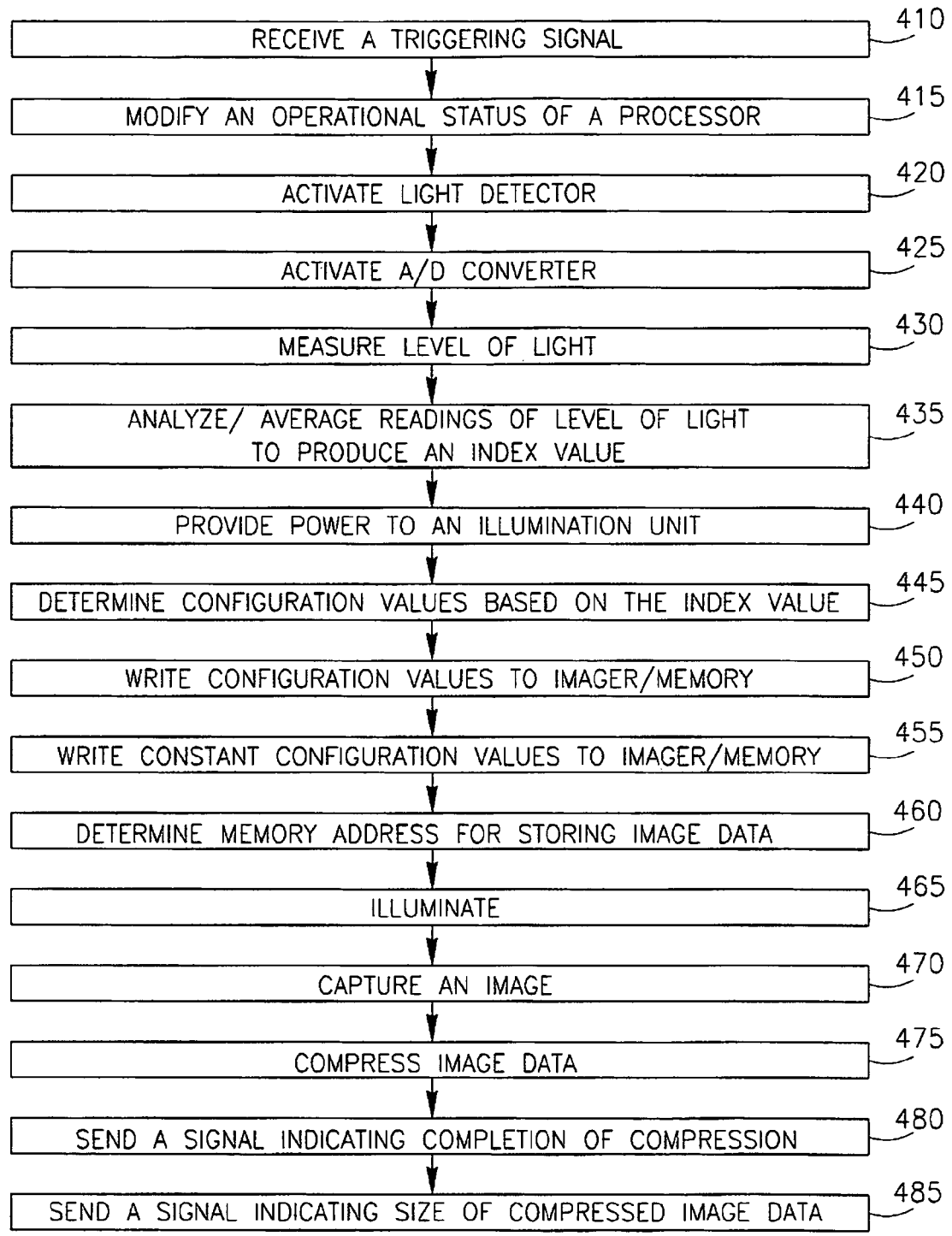
FIG. 4 is a flow-chart diagram of a method of rapid image acquisition in accordance with an embodiment of the invention.

FIG. 4 is a flow-chart diagram of a method of rapid image acquisition in accordance with some embodiments of the invention. The method may be used, for example, by camera 100 of FIG. 1, by camera 210 of FIG. 2, by system 200 of FIG. 2, or by other suitable devices and/or systems. The method of FIG. 4 may be, for example, an implementation of the method of FIG. 3.

The method may include, for example, receiving a triggering signal (box 410). In response to the triggering signal, an operational status of a processor may be modified (box 415), for example, from a power-saving mode or a stand-by mode to an active mode. Additionally, a light detector may be turned on or activated (box 420), and optionally an A/D converter (e.g., included in the processor) may be activated or may be set to be associated with the light detector (box 425). Then, light may be measured, for example, by the light detector (box 430). Optionally, a plurality of light measurements or readings may be used, for example, 40 readings during a time period of approximately 10 milliseconds. The multiple readings may be analyzed or averaged, for example, by the processor, to produce an index value (box 435).

The method may optionally include, for example, providing power to an illumination unit (box 440), e.g., if it is determined that illumination is required based on the index value or if the index value is smaller than a pre-defined threshold. Then, based on the index value, a set of configuration values may be read from a lookup table (box 445), or may be otherwise calculated by the processor. The configuration values may be written to an imager, or to a memory unit associated with the imager and able to store values of operational parameters of the imager (box 450).

In some embodiments, one or more constant or pre-defined configuration values may be written to the imager or to the memory unit associated with the imager (box 455). This may be performed at a suitable time point prior to image acquisition, for example, substantially immediately upon receiving the triggering signal, or together with writing configuration values determined using the lookup table or using calculations. In one embodiment, the operations of box 455 may be performed at other suitable time points, for example, prior to the operations of box 410.

Optionally, a memory address may be determined or set for storing image data to be captured by the imager (box 460).

The method may proceed, for example, by illuminating (box 465) and capturing an image (box 470), e.g., substantially simultaneously. Optionally, while the image is being captured, or substantially immediately after the image is capture, image data may be compressed (box 475), e.g., in accordance with JPEG standard. A signal may be sent indicating that the compression is completed (box 480); optionally, a signal may be sent indicating the size of the compressed image data (box 485), e.g., in bytes or other units.

In some embodiments, the set of operations of boxes 410 to 485 may be performed, for example, in approximately 200 milliseconds, in approximately 250 milliseconds, in approximately 300 milliseconds, or in other sub-second periods of time.

Other suitable operations, or sets of operations may be used in accordance with embodiments of the invention.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An apparatus comprising:
    a digital imager able to acquire one or more images;
    a light detector to detect, without imaging, in response to a triggering event, a light level corresponding to at least a portion of a field-of-view of the digital imager;
    a controller operative to at least partly determine, based on the detected light level and a pre-programmed algorithm and without imaging, one or more configurational values of the digital imager, to transfer the determined configurational values to the digital imager, and to command the digital imager to rapidly, once turned on by a turning-on process, acquire one or more images utilizing the determined configurational values; and
    a triggering unit to perform said turning-on process of the digital imager.

2. The apparatus of claim 1, wherein said light detector is configured to be operable independently of an operational state of said imager.

3. The apparatus of claim 1, wherein the controller is operative to read the one or more configurational values from a lookup table storing a plurality of values of configurational parameters corresponding, respectively, to a plurality of values of light levels.

4. The apparatus of claim 1, wherein the controller is operative to pre-compute the one or more configurational values using a calibration function that takes into account the detected light level.

5. The apparatus of claim 1, wherein the light detector detects the light level based on an analysis of a plurality of light measurements.

6. The apparatus of claim 1, further comprising: an illumination unit to illuminate at least a portion of the field-of-view of the digital imager during rapid image acquisition by the digital imager.

7. The apparatus of claim 1, wherein the digital imager is in non-operational mode prior to the triggering event and in image acquisition mode subsequent to the triggering event.

8. A system comprising:
    a detector operative for detecting, in response to a triggering event, a light level corresponding to at least a portion of a field-of-view of a digital imager;
    an imager pre-configurer operative for at least partly pre-determining, based on the detected light level, and a pre-programmed algorithm and without imaging, one or more configurational values of the digital imager; and
    for commanding the digital imager to acquire one or more images utilizing said configurational values rather than utilizing configurational values generated by performing a digital imager calibration process initiated only after the digital imager is turned on.

9. The system of claim 8, wherein said light detector is configured to be operable independently of an operational state of said imager.

10. The system of claim 8, further comprising: a control unit operatively connected to the apparatus, the control unit able to arm and disarm the apparatus in response to a received command.

11. The system of claim 8, wherein the apparatus further comprises: a transmitter to transmit one or more images rapidly acquired by the digital imager to an external receiver.

12. A method comprising:
    detecting, in response to a triggering event, a light level corresponding to at least a portion of a field-of-view of a digital imager;
    determining, based on the detected light level and a pre-programmed algorithm and without imaging, one or more configurational values of the digital imager; and
    commanding the digital imager to acquire one or more images utilizing the determined configurational values while avoiding a digital imager calibration process.

13. The method of claim 12, wherein said detecting a light level is performed without operating said imager.

14. The method of claim 12, wherein determining comprises: reading the one or more configurational values from a lookup table storing a plurality of values of configurational parameters corresponding, respectively, to a plurality of values of light levels.

15. The method of claim 12, wherein determining comprises: computing the one or more configurational values using a pre-stored calibration function that takes into account the detected light level, thereby to avoid having to calibrate said configurational values after said imager is turned on with consequent undesirable delay in acquisition of said images.

16. A method of acquiring an image comprising:
    detecting a light level corresponding to at least a portion of a field-of-view of a digital imager;
    determining, based at least on the detected light level and a pre-programmed algorithm and without imaging, one or more configurational values for the digital imager;
    altering a state of the digital imager to an operational mode after said steps of detecting and determining; and
    operating the digital imager to acquire one or more images utilizing the determined configurational values.

17. A method according to claim 16 wherein said detecting occurs in response to a triggering event.

18. The apparatus of claim 1 wherein the digital imager is operative to acquire an image utilizing the determined configurational values within less than a second.

19. The apparatus of claim 18 wherein the digital imager is operative to acquire an image utilizing the determined configurational values within 300 milliseconds.

20. A system according to claim 8 wherein the imager pre-configurer at least partly pre-determines at least one configurational value while the digital imager is not capturing and wherein the digital imager's utilization of the pre-determined configurational values rather than relying on configurational values generated only after the digital imager is turned on allows the digital imager to acquire a first image within a second of being turned on.

21. The apparatus of claim 1 wherein the digital imager acquires a plurality of images utilizing said configurational values.

22. The apparatus of claim 1 wherein said triggering event is generated by said triggering unit.

23. The apparatus of claim 1 wherein said configurational values comprise at least one temporal configurational value.

24. The apparatus of claim 1 wherein said configurational values comprise at least one gain value.

25. The apparatus of claim 1, wherein said configurational values comprise at least one color characteristic.

26. The apparatus of claim 23, wherein said temporal configurational value includes at least one of: length of time of exposure period; and frame capture rate.

27. The apparatus of claim 24, wherein said gain value includes at least one of an analog gain value and a digital gain value.

28. The apparatus of claim 25, wherein said color characteristic includes at least one of: a brightness level, a contrast level, a saturation level, a hue level, and a gamma level.

29. A system according to claim 20, wherein the imager pre-configurer pre-determines at least one configurational value while the digital imager is turned off.

30. A system according to claim 20, wherein the imager pre-configurer pre-determines at least one configurational value while the digital imager is in stand-by mode.

31. The apparatus of claim 1, wherein said controller at least partly determines said values while the digital imager is not capturing.

32. The apparatus of claim 1, wherein said controller entirely determines said values while the digital imager is not capturing.

33. A method comprising:
providing a detector operative for detecting, in response to a triggering event, a light level corresponding to at least a portion of a field-of-view of a digital imager;
providing a digital imager pre-configurer operative for at least partly pre-determining, based on the detected light level and a pre-programmed algorithm and without imaging, one or more configurational values of the digital imager; and for commanding the digital imager to acquire one or more images utilizing said configurational values rather than utilizing configurational values generated by performing a digital imager calibration process initiated only after the digital imager is turned on.

* * * * *